United States Patent
Daude

(10) Patent No.: US 6,800,683 B1
(45) Date of Patent: Oct. 5, 2004

(54) COLORED RUBBER COMPOSITION FOR A TIRE

(75) Inventor: Hélène Daude, Clermont-Ferrand (FR)

(73) Assignee: Michelin Recherche et Technique, S.A., Granges-Paccot (CH)

( * ) Notice: Subject to any disclaimer, the term of this patent is extended or adjusted under 35 U.S.C. 154(b) by 109 days.

(21) Appl. No.: 09/583,657

(22) Filed: May 30, 2000

(30) Foreign Application Priority Data

May 28, 1999 (FR) .............................. 99 06856

(51) Int. Cl.⁷ .............................. B60C 1/00; C08K 3/18
(52) U.S. Cl. ...................................... 524/431; 152/525
(58) Field of Search ........................... 524/431; 152/525

(56) References Cited

U.S. PATENT DOCUMENTS

| | | | |
|---|---|---|---|
| 2,427,942 A | 9/1947 | Bulifant | 260/41 |
| 2,655,195 A | 10/1953 | Curtis | 154/4 |
| 4,246,359 A | 1/1981 | Whelan | 521/92 |
| 4,255,296 A | 3/1981 | Ogawa et al. | 260/5 |
| 4,987,192 A * | 1/1991 | Oberster et al. | 525/274 |

FOREIGN PATENT DOCUMENTS

| | | |
|---|---|---|
| EP | 0022365 | 1/1981 |
| FR | 996751 | 12/1951 |
| GB | 741169 A | 11/1955 |

* cited by examiner

*Primary Examiner*—Peter D. Mulcahy
(74) *Attorney, Agent, or Firm*—Fitzpatrick, Cella, Harper & Scinto

(57) ABSTRACT

The invention relates to a sulphur-vulcanizable colored rubber composition comprising at least one elastomeric base, at least 30 parts of which per 100 parts by weight of elastomer (phr) comprises an essentially unsaturated diene elastomer, wherein the composition comprises at least 50 phr of non-stoichiometric iron oxide.

7 Claims, No Drawings

COLORED RUBBER COMPOSITION FOR A TIRE

BACKGROUND OF INVENTION

The present invention relates to rubber compositions intended for use in the manufacture of tires.

More particularly, the invention provides colored rubber compositions intended to form at least part of the outer surface of tires. The term "colored" is understood here to exclude the color black, but to include all colors, including white.

The compositions of the invention are intended to cover the surfaces of tires at least partially, whatever the nature and the composition of the rubber mixes on which they are deposited. Since the compositions form a surface covering, they are more particularly intended to cover what are called "non-wearing" surfaces of tires, that is to say those which are not in contact with the road under normal conditions of use. Thus, such colored compositions according to the invention, which are in particular for decorative and marking purposes, may constitute, at least in part, the outer surface of a tire sidewall or the bottoms of tread patterns of the tread.

It is known that, vulcanized rubber compositions of essentially unsaturated natural and synthetic diene rubbers, because of the presence of double bonds in their molecular chains, are likely to deteriorate more or less rapidly after prolonged exposure to the atmosphere, if they are not protected, as a result of known oxidation mechanisms. These complex mechanisms have been described, for example, in the following documents: ref. [1]: "Antidegradants for tire applications" in "Tire compounding", Education Symposium No. 37 (ACS), Cleveland, Communication I, October 1995; and [2]: "Antioxidants" in Encycl. Polym. Sci. and Eng., 2d Edition, Vol. 2, 73–91.

It has been gradually possible to inhibit these oxidation phenomena as a result of the development and sale of various antioxidants, the most effective of which are, known derivatives of quinoline ("TMQ"), or derivatives of p-phenylenediamine ("PPD" or "PPDA"), which are even more active than the former, such as, for example, N-1,3-dimethylbutyl-N'-phenyl-p-phenylenediamine (6-PPD). These TMQ and PPD-type antidegradants, singly or in combination with each other, have found widespread systematically use (see, e.g., refs. [1] and [2] above) in conventional tire rubber compositions, filled at least in part with carbon black, which imparts thereto their characteristic black color.

However, the above-mentioned antioxidants, particularly the TMQ or PPD derivatives, are not light-fast. Under the action of UV radiation, they produce colored chemical types which cause an adverse color change of the rubber compositions, staining them dark brown. It is clear that this characteristic rules out the use of such agents within white, clear or colored compositions. Moreover, such characteristics of these antioxidants also cause problems when used in compositions that come into contact with white, clear or colored compositions. If nothing is done to prevent it, the antioxidants will naturally migrate into and onto the surface of the white, clear or colored compositions and stain them.

This is why it is extremely complicated to develop colored compositions intended to cover part of the outer surface of tires and to resist the staining due to the antioxidants present in the other compositions used in tires.

The majority of the solutions that have been considered are based on the use of constituents, that have impereability properties, which may be introduced into rubber compositions. In the tire field, it is known to make use of the impermeability properties of butyl rubber. However, using butyl rubber also creates a number of problems.

In order to make it possible to produce white or colored sidewalls, it has been envisaged to modify the structure of the tires by providing "screen" compositions containing a large amount of butyl rubber in order to prevent the migration of the staining antioxidants. Such screen compositions are intended to separate the white compositions from the other compositions making up said tires. It will readily be understood that such embodiments are liable to adversely affect the properties and performance of the tires concerned, to the extent that significant modifications are made to their structure. Furthermore, it is known that large proportions of butyl rubber in compositions create problems of adhesion of the latter to the other compositions present in the tire.

Other solutions have consisted of directly introducing butyl rubber into the colored compositions. Thus publication CA-2 228 692 describes a composition for white sidewalls which uses an elastomeric base containing a majority of butyl rubbers in order to constitute a barrier to the staining antioxidants. These solutions make it possible to avoid certain modifications of the structure of the tire, but do not rectify the problems linked to adhesion. This is why, since the interface obtained between white sidewalls and the other mixes present in the tire is fragile, such compositions for white sidewalls can only be deposited on very limited non-stressed parts of the sidewall, in order to avoid detachment at interfaces of the compositions.

Additional solutions involve producing compositions intended to be used within the mass and not just at the surface, which abandon the use of the antioxidants based on PPD or TMQ derivatives within these compositions. However, because such antioxidants are very effective, replacing them requires providing complex protective systems, such as those described in the publication WO 99/02590. It should furthermore be noted that it is not generally possible, in all the compositions present in the tire, to replace the antioxidants based on PPD or TMQ derivatives, which are very high-performance. Thus, because of their migration, it is necessary to provide a solution, such as that using butyl rubber, the drawbacks of which have already been mentioned.

SUMMARY OF THE INVENTION

The invention is directed to colored compositions capable of forming part of the outer surface of tires, which overcome the disadvantages of prior compositions.

The Inventor has surprisingly discovered that sulphur-vulcanizable, colored rubber compositions having a very high content of non-stoichiometric iron oxide, in an amount of more than 50 phr (parts per 100 parts by weight of elastomer), make it possible to produce colored surface compositions for tires which are capable of being deposited directly on compositions containing staining antioxidants, without requiring the use of barrier agents typical of antioxidants and preserve their surface color.

Because of the known photocatalytic activity of non-stoichiometric iron oxides which cause degradation of organic or biorganic molecules, the existence of such properties a priori would prevent the person skilled in the art from using large quantities of these oxides for several reasons: (1) because the properties of degrading double bonds are contrary to desired protective characteristics intended in the tire to avoid this degradation by oxidation, and (2) it is quite surprising that the presence of non-stoichiometric iron oxides alone makes it possible to render the surface of the compositions self-cleaning with such a small amount.

The invention is therefore a sulphur-vulcanizable colored rubber composition comprising at least one elastomeric base, at least 30 parts of which per 100 parts by weight of elastomer (phr) comprises an essentially unsaturated diene elastomer, the composition having a content of at least 50 phr of non-stoichiometric iron oxide. In particular, the non-stoichiometric iron oxide may be non-stoichiometric iron monoxide or non-stoichiometric iron (III) oxide, $Fe_2O_3$.

DETAILED DESCRIPTION

"Diene" elastomer or rubber is understood to mean, in known manner, an elastomer resulting at least in part (i.e. a homopolymer or a copolymer) from diene monomers (monomers bearing two double carbon-carbon bonds, whether conjugated or not).

Generally, "essentially unsaturated" diene elastomer is understood to mean a diene elastomer resulting at least in part from conjugated diene monomers having a content of members or units of diene origin (conjugated dienes) which is greater than 15% (mole %).

Thus, for example, diene elastomers such as butyl rubbers or copolymers of dienes and of alpha-olefins of the EPDM type do not fall within the preceding definition, and may in particular be described as "essentially saturated" diene elastomers (low or very low content of units of diene origin which is always less than 15%).

Within the category of "essentially unsaturated" diene elastomers, "highly unsaturated" diene elastomer is understood to mean a diene elastomer having a content of units of diene origin (conjugated dienes) which is greater than 50%.

These definitions being given, the following are understood to be meant by essentially unsaturated diene elastomer capable of being used in the compositions according to the invention:

(a) any homopolymer obtained by polymerization of a conjugated diene monomer having 4 to 12 carbon atoms; or (b) any copolymer obtained by copolymerization of one or more dienes conjugated together or with one or more vinyl aromatic compounds having 8 to 20 carbon atoms.

Suitable conjugated dienes are, in particular, 1,3-butadiene, 2-methyl-1,3-butadiene, the 2,3-di($C_1$ to $C_5$ alkyl)-1,3-butadienes such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene.

Suitable vinyl aromatic compounds are, in particular, styrene, ortho-, meta- and para-methylstyrene, the commercial mixture "vinyl-toluene", para-tertiobutylstyrene, the methoxy-styrenes, the chloro-styrenes, vinyl mesitylene, divinyl benzene and vinyl naphthalene.

The copolymers comprise between 99% and 20% by weight of diene units and between 1% and 80% by weight of vinyl aromatic units. The elastomers may have any microstructure, which is a function of the polymerization conditions used, in particular of the presence or absence of a modifying and/or randomizing agent and the quantities of modifying and/or randomizing agent used. The elastomers may, for example, be block, statistical, sequenced or microsequenced elastomers, and may be prepared in dispersion or in solution.

Polybutadienes are preferred, particularly those having a 1,2 bond content of between 4% and 80% and those having a content of cis-1,4 bonds of more than 90%, polyisoprenes; butadiene-styrene copolymers, and in particular those having a styrene content of between 5% and 50% by weight and, more particularly, between 20% and 40% by weight, a 1,2 bond content of the butadiene part of between 4% and 65%, and a content of trans-1,4 bonds of between 20% and 80%; butadiene-isoprene copolymers, particularly those having an isoprene content of between 5% and 90% by weight and a glass transition temperature (Tg) of −40° C. to −80° C. and isoprene-styrene copolymers, particularly those having a styrene content of between 5% and 50% by weight and a Tg of between −25° C. and −50° C.

In the case of butadiene-styrene-isoprene copolymers, there are suitable in particular those having a styrene content of between 5% and 50% by weight and, more particularly, between 10% and 40%, an isoprene content of between 15% and 60% by weight, and more particularly between 20% and 50%, a butadiene content of between 5% and 50% by weight, and more particularly between 20% and 40%, a content of 1,2-units of the butadiene part of between 4% and 85%, a content of trans-1,4 units of the butadiene part of between 6% and 80%, a content of 1,2- plus 3,4-units of the isoprene part of between 5% and 70%, and a content of trans-1,4 units of the isoprene part of between 10% and 50%, and more generally any butadiene-styrene-isoprene copolymer having a Tg of between −20° C. and −70° C., and more generally any butadiene-styrene-isoprene copolymer having a Tg of between 20° C. and −70° C.

In particular, the diene elastomer of the composition of the invention is selected from among strongly unsaturated diene elastomers which include polybutadienes (BR), polyisoprenes (IR) or natural rubber (NR), butadiene-styrene copolymers (SBR), butadiene-isoprene copolymers (BIR), isoprene-styrene copolymers (SIR), butadiene-acrylonitrile copolymers (NBR), isoprene-styrene copolymers (SIR) [sic], butadiene-styrene-isoprene copolymers (SBIR), or a mixture of two or more of these compounds.

Such diene elastomers may be used alone or in a blend with other elastomers conventionally used in tires, such as the diene elastomers comprising:

a ternary copolymer obtained by copolymerization of ethylene, and an α-olefin having 3 to 6 carbon atoms with a non-conjugated diene monomer having 6 to 12 carbon atoms, such as, elastomers obtained from ethylene or from propylene with a non-conjugated diene monomer of the afore-mentioned type, particularly 1,4-hexadiene, ethylidene norbornene or dicyclopentadiene;

a copolymer of isobutene and isoprene (butyl rubber or IIR), as well as the halogenated, particularly chlorinated or brominated, versions (BIIR), of this copolymer; or a copolymer of isobutene and paramethylstyrene, as well as halogenated, particularly chlorinated or brominated, versions (BIMS), of this type of copolymer.

It is clear that the photocatalytic properties of the non-stoichiometric iron oxides can only be used effectively where there is a sufficient presence of elastomers having unsaturated bonds liable to be degraded, e.g., in the order of 30% of the elastomeric base. Furthermore, in order to be able to deposit the colored compositions of the invention on any non-wearing tire surface as described above, it is necessary that the elastomeric base of the non-wearing tire surface primarily comprise such essentially unsaturated diene elastomers.

Preferred non-stoichiometric iron oxides are non-stoichiometric iron monoxides and non-stoichiometric iron (III) oxide ($Fe_2O_3$).

Since iron monoxide is yellow and $Fe_2O_3$ is red in color, they may be used alone, together or in the presence of other colored pigments or optical brightening agents in order to obtain yellow or other colors, bearing in mind that the elementary rules of color mixing apply.

Thus it is possible to use any type of coloring agent known to the person skilled in the art, including coloring agents that are organic or inorganic, and soluble or insoluble, in the compositions according to the invention. Non-limiting examples include mineral colorants, such as, powdered metals, in particular powdered copper or aluminum, various metal oxides, in particular silicates, aluminates or titanates, iron oxides or hydroxides, mixed oxides of different metallic elements such as Co, Ni, Al or Zn. Organic pigments such as indanthrones, diketo-pyrrolo-pyrroles or diazo condensates, or organometallic pigments such as phthalocyanines are also considered.

The compositions may also contain a reinforcing filler such as carbon black or silica to impart other types of properties to the compositions according to the invention. However, it is important to consider the color of the filler, which may modify or adversely affect the desired coloration of the composition.

With consideration of the above-described aspects of coloration, the compositions according to the invention contain, in addition to the compounds previously described, all or part of the constituents usually used in diene rubber compositions for tires, such as plasticizers, a cross-linking system based either on sulphur or on sulphur and/or peroxide donors, vulcanization accelerators, extender oils, of the aromatic, naphthenic or paraffinic type, and also various anti-fatigue agents.

The rubber compositions are prepared using the diene elastomers according to well known techniques, by thermo-mechanical working in one or two stages in an internal paddle mixer, followed by mixing on an external mixer.

According to conventional techniques, a conventional internal mixer is used to mix the elastomers, the filler and the other constituents of the composition with the exception of the vulcanization system. The mixture obtained then taken up on an external mixer, generally an open mill, and then the vulcanization system is added thereto. One or more stages may be added in the internal mixer, essentially with the aim of making the mixture undergo complementary thermomechanical treatment.

The invention is illustrated in non-limitative manner by the following examples, which are not intended to limit the scope of the invention.

EXAMPLES

In these examples, the properties of the compositions were evaluated as follows.

The calorimetric values are determined by means of a Microflash 200 D DATA COLOR spectrocolorimeter in D65/10 configuration (daylight; angle of observation 10°). The calorimetric properties are measured in known manner, in accordance with the instruction manual for the colorimeter (May 1995), by analyzing the reflectance spectrum of the test pieces.

These measurements are transferred to the "CIE LAB" system of the 3 three-dimensional colorimetric coordinates L*, a*, b*, in which system:

the a* axis represents the green-red chromaticity coordinate, with a scale from −100 (green) to +100 (red);

the b* axis represents the blue-yellow chromaticity coordinate, with a scale from −100 (blue) to +100 (yellow);

the L* axis represents the luminosity coordinate, with a scale from 0 (black) to 100 (white);

$\Delta E=[(\Delta L^*)^2+(\Delta a^*)^2+(\Delta b^*)^2]^{1/2}$ represents the overall average calorimetric deviation of each sample relative to a non-aged control; the higher $\Delta E$ is, the more the color of the composition has changed.

In the colorimetry tests, the test pieces used were non-standardized test pieces consisting of strips of rubber of dimensions (l×w ×t) of 150×150×3 millimeters (mm), with one face A comprising a reference composition over a thickness of 2 mm and the other face B comprising over its entire thickness two strips of rubber over a width of 65 mm respectively, which surrounds a strip of rubber of a composition to be tested.

These test pieces were left static outside for a given period, wherein face B which comprises the composition to be tested was located in the open air. At the end of this period, the surface of the face B was rubbed with an ordinary cloth impregnated with ethanol so as to remove any chalking dust which cannot be removed statically, then the colorimetric deviation $\Delta E$ was measured. A colorimetric deviation $\Delta E$ less than or equal to 25 is considered acceptable, within an approximation of ±2. In fact, such a calorimetric deviation is representative of a color change which remains within the range of the initial color.

For all the examples which follow, the composition to be tested contained an elastomeric base formed by a 60/40 mixture of a natural rubber and a polybutadiene, which are both strongly unsaturated diene elastomers.

The reference composition, referred to as composition A hereafter, is a support composition close to those used in the sidewalls of tires filled with carbon black. It is clear that these examples in no way restrict the results obtained from the superposition of compositions according to the invention on this type of conventional composition, given that the demonstration essentially depends on the presence of anti-oxidants in these compositions.

The formulation of reference composition A is as follows, with all the parts being expressed by weight, and in which the elastomer was a 35/65 blend of natural rubber and polybutadiene:

| | | |
|---|---|---|
| Elastomer | : | 100 |
| Carbon black (N660) | : | 60 |
| Aromatic oil | : | 20 |
| Wax (a) | : | 1 |
| Zinc oxide | : | 3 |
| Stearic acid | : | 1 |
| TMQ | : | 1 |
| 6-PPD | : | 3 |
| Sulphenamide (b) | : | 0.95 |
| Sulphur | : | 1.6 |

(a) antiozonant wax (Redezon 500, from Repsol)
(b) sulphenamide : N-cyclohexyl-2-benzothiazyl sulphenamide.

The formulation of each of the compositions B to be tested which are used for the test pieces varied only according to the nature and quantity of filler and/or pigment used, namely a formulation below in which all the parts are expressed by weight and in which the elastomer was a 60/40 blend of natural rubber and polybutadiene:

| Elastomer | : | 100 |
| --- | --- | --- |
| Paraffin oil | : | 15 |
| Stearic acid | : | 2 |
| Zinc oxide | : | 3 |
| Sulphur | : | 2 |
| Sulphenamide (a) | : | 2 |
| Filler and/or pigment | : | variable* |

(a) sulphenamide : N-cyclohexyl-2-benzothiazyl sulphenamide.
*The fillers and pigments used are as follows:
- yellow 3G : yellow pigment Cromophtal (Ciba-Geigy),
- silica : ultrasil VN2 (Degussa),
- "anatase" titanium oxide (Thann et Mulhouse),
- iron monoxide, yellow pigment (Bayer).

The following procedure was used to prepare the B compositions used for all the examples below: The diene elastomer or the mixture of elastomers is introduced into an internal mixer filled to 75%, the temperature of which is approximately 30° C. After an appropriate kneading time, for example of the order of one minute, all the other ingredients are added except for the vulcanization system and ⅔ of the mineral filler. After another kneading time the remaining ⅓ of the mineral filler is introduced and the thermomechanical kneading operation is continued until a given dropping temperature (165° C.) is obtained. The mixture thus obtained is recovered, then the vulcanization system is added on an external mixer (homo-finisher) at 30° C. Vulcanization is carried out at 165° C. for 10 min.

For composition A, given the small amount of filler, it was not necessary to introduce the filler in two operations.

Example 1

The object of this example was to compare the resistance to staining of compositions including distinct fillers. The test pieces produced, as previously stated, contain the mixture of reference composition A and the B compositions to be tested having in their formulation in addition to the constituents referred to above, respectively:

compositions $B1_{(100)}$, $B1_{(150)}$, $B1_{(200)}$: 20 phr of yellow colored pigment 3G and respectively 50/50, 75/75 and 100/100 phr of a chalk/kaolin blend, compositions $B2_{(50)}$, $B2_{(100)}$: 5 phr of yellow colored pigment 3G and respectively 50 and 100 phr of silica, compositions $B3_{(20)}$, $B3_{(50)}$, $B3_{(100)}$, $B3_{(150)}$, $B3_{(200)}$ respectively of iron monoxide, composition $B4_{(50)}$: 20 phr of a yellow colored pigment 3G and 50 phr of titanium dioxide.

It will be noted that for easier comparison between the different test pieces produced, compositions containing a white filler (chalk, kaolin, silica, titanium dioxide) used a yellow pigment (yellow 3G) which makes it possible to have the same coloration before photo-oxidation, wherein the amount of yellow 3G is less in the case of silica, which is not an opacifying filler. This is different from the other fillers present in this example.

Compositions B3 are in accordance with the invention.

The results obtained are set forth in Table I below.

TABLE I

| Composition: | | | | | | | | | | | |
| --- | --- | --- | --- | --- | --- | --- | --- | --- | --- | --- | --- |
| | $B1_{(100)}$ | $B1_{(150)}$ | $B1_{(200)}$ | $B2_{(50)}$ | $B2_{(100)}$ | $B3_{(20)}$ | $B3_{(50)}$ | $B3_{(105)}$ | $B3_{(150)}$ | $B3_{(200)}$ | $B4_{(50)}$ |
| ΔE* | 48 | 43 | 44 | 44 | 30 | 25 | 9 | 7 | 2 | 1 | 33 |

*The ΔE were calculated after exposure of the test pieces in the open air for 90 days.

It will be noted that compositions B1 and B2 containing silica or chalk/kaolin mineral fillers, even in large amounts, exhibit unacceptable alterations in color. This is also the case for composition B4, which contains 50 phr of titanium dioxide, even though titanium dioxide is known for its photocatalytic properties.

Compositions $B3_{(50)}$, $B3_{(100)}$, $B3_{(150)}$, $B3_{(200)}$ of the invention yield very that the surface has retained a yellow coloration included within the range of the initial yellow. While the results in Table 1 show that the compositions containing iron monoxide are very good with an amount corresponding to 50 phr and improve with 100 phr, they are excellent from 150 phr upwards. Conversely, it is noted that an amount of 20 phr of iron monoxide is completely inadequate, (composition $B3_{(20)}$ exhibiting unacceptable color alterations).

Example 2

The object of this example was to illustrate the resistance to staining of an iron oxide other than iron monoxide, or red-colored $Fe_2O_3$. The test pieces produced, as in the previous example, contain the mix consisting of reference composition A and the compositions B to be tested, $B5_{(50)}$, $B5_{(100)}$, $B5_{(150)}$ having 50, 100 and 150 phr of $Fe_2O_3$ respectively in their formulations.

The results are set forth in Table II below.

TABLE II

| Composition: | $B5_{(50)}$ | $B5_{(100)}$ | $B5_{(150)}$ |
| --- | --- | --- | --- |
| ΔE* | 6 | 2.4 | 0.8 |

In compositions B5 according to the invention, the surfaces retained a red coloration which are within the range of red. The results of the compositions containing $Fe_2O_3$ are very good with an amount corresponding to 50 phr, and, as with iron monoxide, become excellent from 100 phr upward, improving even further at 150 phr.

Thus, unexpectedly, the photocatalytic properties of non-stoichiometric iron oxides used in the compositions according to the invention to degrade the elastomer itself, by introducing said iron oxides into the matrix of the rubber composition, in order to obtain surface erosion which permits elimination of the staining linked to the antioxidants. In dynamic use of the tires, this "self-cleaning", which corresponds to surface renewal, also involves the disappearance of soiling coming from outside the tire, such as brake dust.

What is claimed is:

1. A tire having a sidewall comprising a colored rubber composition, wherein the colored rubber composition comprises at least one elastomeric base comprising at least 30 phr of an essentially unsaturated diene elastomer, wherein the colored rubber composition comprises at least 50 phr of non-stoichiometric iron oxide.

2. The tire according to claim 1, wherein the composition comprises least 50 phr of non-stoichiometric iron monoxide.

3. The tire according to claim 1, wherein the composition comprises least 50 phr of non-stoichiometric iron (III) oxide.

4. The tire according to claim 1, wherein the elastomeric base comprises primarily an essentially unsaturated diene elastomer.

5. The tire according to claim 1, wherein the colored rubber composition comprises at least 100 phr of non-stoichiometric iron oxide.

6. The tire according to claim 1, wherein the colored rubber composition comprises at least 150 phr of non-stoichiometric iron oxide.

7. The tire according to claim 1, wherein the essentially unsaturated diene elastomer is a blend of natural rubber and polybutadiene.

* * * * *